United States Patent
Adler et al.

(10) Patent No.: US 12,256,432 B2
(45) Date of Patent: Mar. 18, 2025

(54) ON-VEHICLE ULTRA-WIDEBAND SYSTEM AND METHOD

(71) Applicant: GM GLOBAL TECHNOLOGY OPERATIONS LLC, Detroit, MI (US)

(72) Inventors: Aaron Adler, Rochester Hills, MI (US); Lakshmi V. Thanayankizil, Rochester Hills, MI (US); Djordje Preradovic, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 425 days.

(21) Appl. No.: 17/743,886

(22) Filed: May 13, 2022

(65) Prior Publication Data

US 2023/0371072 A1 Nov. 16, 2023

(51) Int. Cl.
*H04W 84/12* (2009.01)
*H04B 1/7163* (2011.01)
*H04W 4/48* (2018.01)
*H04W 74/0816* (2024.01)

(52) U.S. Cl.
CPC ...... *H04W 74/0816* (2013.01); *H04B 1/7163* (2013.01); *H04W 4/48* (2018.02); *H04W 84/12* (2013.01)

(58) Field of Classification Search
CPC .......................... H04W 4/48; H04W 74/0004
USPC ....................................... 370/329, 300, 401
See application file for complete search history.

(56) References Cited

U.S. PATENT DOCUMENTS

| | | | |
|---|---|---|---|
| 2020/0062217 A1 | 2/2020 | Ledvina et al. | |
| 2022/0026531 A1* | 1/2022 | Wu | .......... G01S 13/88 |
| 2024/0137791 A1* | 4/2024 | Cao | .......... H04W 24/08 |

* cited by examiner

*Primary Examiner* — Dang T Ton
(74) *Attorney, Agent, or Firm* — Quinn IP Law

(57) ABSTRACT

A wireless communication system for a vehicle includes a wireless access point (AP), an ultra-wide band (UWB) system, a communication link, a controller, and a vehicle system. The UWB system is in communication with the wireless AP via a communication link. The wireless communication system is operable to detect, via the wireless AP, a request for localized wireless communication. The UWB system requests the wireless AP to generate a clear to send (CTS) transmission, which includes selecting an ultra-wide band (UWB) channel, mapping the UWB channel to a plurality of WiFi channels, and transmitting, by the wireless AP, the CTS transmission to each of the plurality of WiFi channels. The UWB system then transmits a UWB message.

17 Claims, 3 Drawing Sheets

ON-VEHICLE ULTRA-WIDEBAND SYSTEM AND METHOD

INTRODUCTION

Vehicles employ wireless systems to enable on-board and near-range off-board communication employing a wireless local area network or WLAN. One wireless system is based upon IEEE 802.11, and may be commonly referred to as Wi-Fi.

By way of a non-limiting example, vehicles may employ proximity key fobs that can automatically lock or unlock access points when a person carrying a fob is proximal. There may be a benefit to enabling a mobile phone or smart watch to perform the functions of a key fob.

SUMMARY

The concepts described herein provide a method, computer product, and vehicle system that include a system strategy for sending standardized IEEE Wi-Fi MAC layer protocols from a vehicle's Wi-Fi access point (AP) to periodically clear/stop other nearby Wi-Fi access points/devices. It does this by sending a Wi-Fi Clear to Send (CTS) transmission to itself over multiple Wi-Fi channels while aligning this transmission with UWB ranging localization. This facilitates both Wi-Fi and ultra-wideband (UWB) technologies to operate on the vehicle with decreased interference from each other and from other devices.

An aspect of the disclosure is a wireless communication system for a vehicle that includes a wireless access point (AP), an ultra-wide band (UWB) system, a communication link, a controller, and a vehicle system. The UWB system is in communication with the wireless AP via a communication link. The wireless communication system is operable to detect, via the wireless AP, a request for localized wireless communication. The UWB system requests the wireless AP to generate a clear to send (CTS) transmission, which includes selecting an ultra-wide band (UWB) channel, mapping the UWB channel to a plurality of WiFi channels, and transmitting, by the wireless AP, the CTS transmission to each of the plurality of WiFi channels. The UWB system then transmits a UWB message.

Another aspect of the disclosure includes transmitting, by the wireless AP, the clear to send (CTS) transmission to each of the plurality of WiFi channels by sequentially transmitting, by the wireless AP, the CTS transmission to each of the plurality of WiFi channels.

Another aspect of the disclosure includes mapping the UWB channel to the plurality of WiFi channels by identifying a plurality of sequential WiFi channels corresponding to the UWB channel.

Another aspect of the disclosure includes the UWB channel being UWB channel 5, wherein the plurality of sequential WiFi channels corresponding to the UWB channel being WiFi channels 57, 61, 65, . . . 157, which indicates WiFi channels that increment by four between WiFi channel 57 and WiFi channel 157, i.e., every fourth WiFi channel WiFi channel 57 to WiFi channel 157.

Another aspect of the disclosure includes the UWB system being in communication with the wireless AP via a communication link, and wherein the UWB system requests the wireless AP to generate the CTS transmission via the communication link.

Another aspect of the disclosure includes the UWB message being a vehicle command; and wherein transmitting, via the UWB system, the UWB message includes enabling the vehicle command.

Another aspect of the disclosure includes the vehicle command being one of locking an access door, unlocking an access door, opening an access door, or activating a vehicle system.

Another aspect of the disclosure includes a method for controlling wireless communication on-vehicle that includes detecting, via an on-vehicle wireless access point (AP), a request for localized wireless communication. The wireless AP is requested to generate a clear to send (CTS) transmission, which includes selecting an ultra-wide band (UWB) channel, mapping the UWB channel to a plurality of WiFi channels, and transmitting, by the wireless AP, the clear to send (CTS) transmission to each of the plurality of WiFi channels. The UWB system transmits a UWB message, which is a vehicle command in one embodiment.

Another aspect of the disclosure includes a computer product in the form of a non-transitory computer readable medium storing a plurality of instructions, that when executed, control an on-vehicle computing device to perform the following: detecting, via an on-vehicle wireless access point (AP), a request for localized wireless communication. The wireless AP is requested to generate a clear to send (CTS) transmission, which includes selecting an ultra-wide band (UWB) channel, mapping the UWB channel to a plurality of WiFi channels, and transmitting, by the wireless AP, the clear to send (CTS) transmission to each of the plurality of WiFi channels. The UWB system transmits a UWB message, which is a vehicle command in one embodiment.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
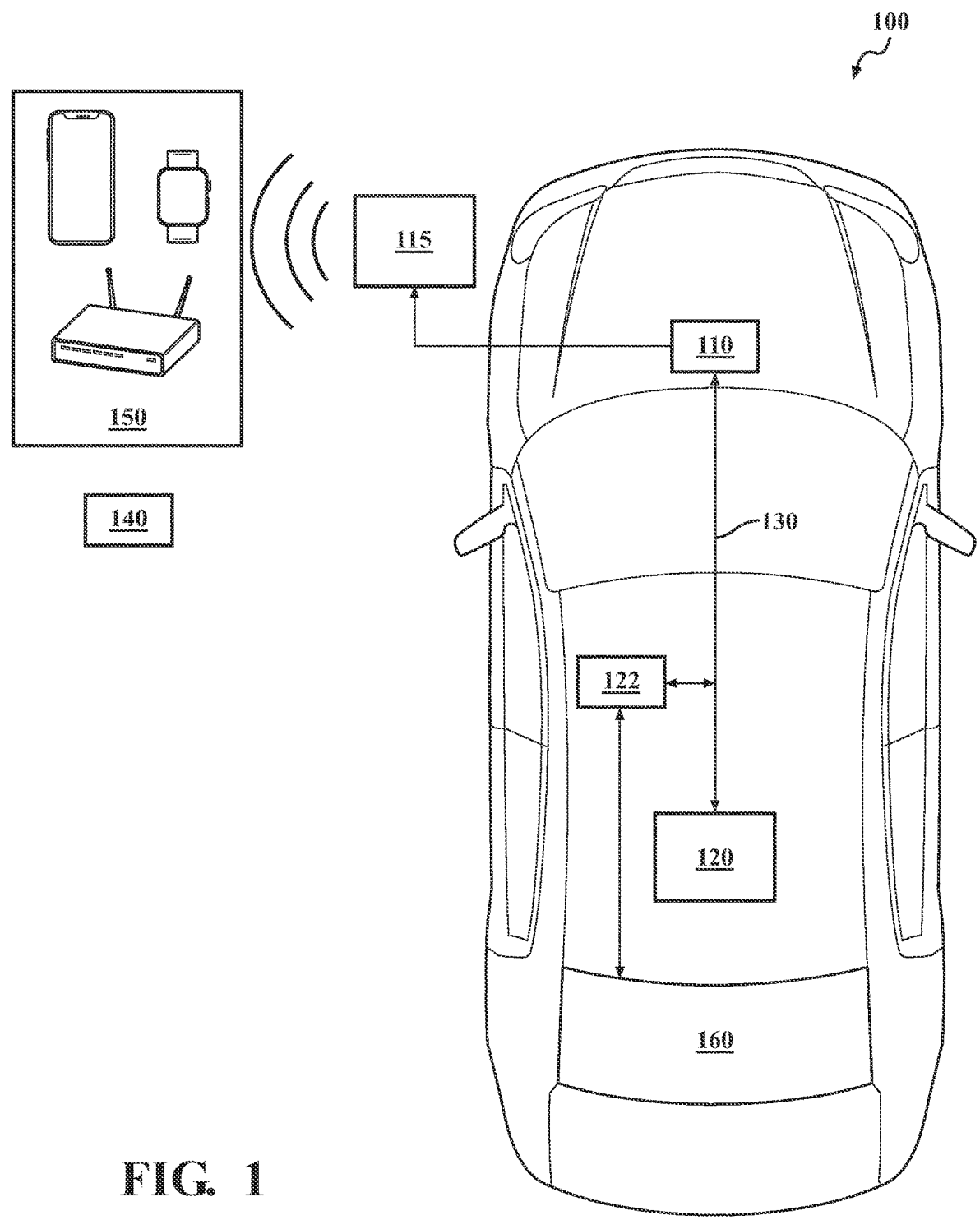
FIG. 1 pictorially shows a top-view of a vehicle including an ultra-wide band (UWB) system and a wireless access point (AP), in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure.

The following detailed description is merely exemplary in nature and is not intended to limit the application and uses. Furthermore, there is no intention to be bound by expressed or implied theory presented in the preceding technical field, background, brief summary or the following detailed description. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Exemplary embodiments may be described herein in terms of functional and/or logical block components and various processing steps. It should be appreciated that such block components may be realized by a combination or collection of mechanical and electrical hardware, software, and/or firmware components configured to perform the specified functions. For example, an embodiment of the disclosure may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with mechanical and/or electronic systems, and that the vehicle systems described herein are merely exemplary embodiments of possible implementations.

The use of ordinals such as first, second and third does not necessarily imply a ranked sense of order, but rather may distinguish between multiple instances of an act or structure.

Referring to the drawings, wherein like reference numerals correspond to like or similar components throughout the several Figures, FIG. 1, consistent with embodiments disclosed herein, illustrates a top-view of a vehicle 100 that includes an ultra-wide band (UWB) system 120 and a wireless access point (AP) 110. The UWB system 120 communicates with the wireless AP 110 via a communication link 130. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 100 also includes a vehicle system 160 that may be an access door 160. The access door 160 provides for ingress and egress of passengers, or is a storage compartment. The vehicle 100 includes a controller 122, which communicates via the communication link 130 with the wireless AP 110, the UWB system 120, and the access door 160.

The vehicle 100 may be proximal to other devices 150 that are capable of wireless communication, including devices that may be attempting to communicate with the wireless access point (AP) 110 of the vehicle 100. The other devices 150 may include, by way of non-limiting examples, stationary devices such as home or industrial routers, portable wireless devices such as smartphones, watches, and/or other devices. The vehicle 100 may also pass in proximity to V2X devices 140 include, by way of non-limiting examples, other vehicles having wireless APs, and roadside APs that may be part of a V2X system.

The ultra-wide band (UWB) system 120 is a short-range, wireless communication system having a protocol that operates through radio waves. The UWB system 120 operates over a broad spectrum of frequencies in the gigahertz (GHz) range, and can be used to capture highly accurate spatial and directional data. The UWB system 120 employs low-energy pulse communication for short-range, high-bandwidth applications. By measuring time of flight across various frequencies, it is possible to measure distance between modules while overcoming multipath errors. This has allowed UWB modules to be applied towards localization and tracking problems. The UWB system 120 is capable of precisely locking onto an object, determining its location and communicating with it. One of UWB's most significant advantages is a physical layer that is used to send and receive data packets. With this layer, which may be specified in IEEE 802.15.4z, a critical security extension not available in other technologies can be leveraged, allowing for security techniques such as cryptography and random number generation that deter attackers from accessing UWB communications. The use of UWB ranging can increase the accessible area of autonomous vehicles employing collaborative localization techniques. Furthermore, because the UWB system 120 operates in a separate section of the radio spectrum that is away from radiofrequency bands around 2.4 GHz, it is capable of operating and coexisting with other wireless technologies such as Wi-Fi, Bluetooth and near-field communication (NFC).

The wireless access point (AP) 110 includes an RF broadcaster 115 that is capable of broadcasting a RF signal, as described herein The UWB system 120 communicates with the AP 110 via the communication link 130. In one embodiment, the communication link 130 is part of an on-vehicle controller area network (CAN) or a local interconnect network (LIN) that employ a wired serial or parallel communication link.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using communication link 130, which can be a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

This disclosure defines a system strategy for sending standardized IEEE Wi-Fi MAC layer protocols from a vehicle's Wi-Fi Access Point to clear/stop periodically other nearby Wi-Fi access points/devices. It does this by sending a Wi-Fi Clear to Send (CTS) transmission to itself over multiple Wi-Fi Channels while aligning this transmission with UWB ranging localization. By doing so this will allow both Wi-Fi and Ultra-wideband technologies to both operate on the vehicle with decreased interference.

As described with reference to FIG. 2, a method and system for controlling wireless communication on-vehicle include detecting, via an on-vehicle wireless access point (AP), a request for localized wireless communication, and requesting, via an ultra-wide band (UWB) system, the wireless AP to generate a clear to send (CTS) transmission. This includes selecting an ultra-wide band (UWB) channel, mapping the UWB channel to a plurality of WiFi channels, and transmitting, by the wireless AP, the clear to send (CTS) transmission to each of the plurality of WiFi channels. Subsequently, a UWB message is transmitted via the UWB system in response to the request for localized wireless communication. The teachings may be described herein in terms of functional and/or logical block components and/or various processing steps. It should be realized that such block components may be composed of hardware, software, and/or firmware components that have been configured to perform the specified functions.

Figure 2:
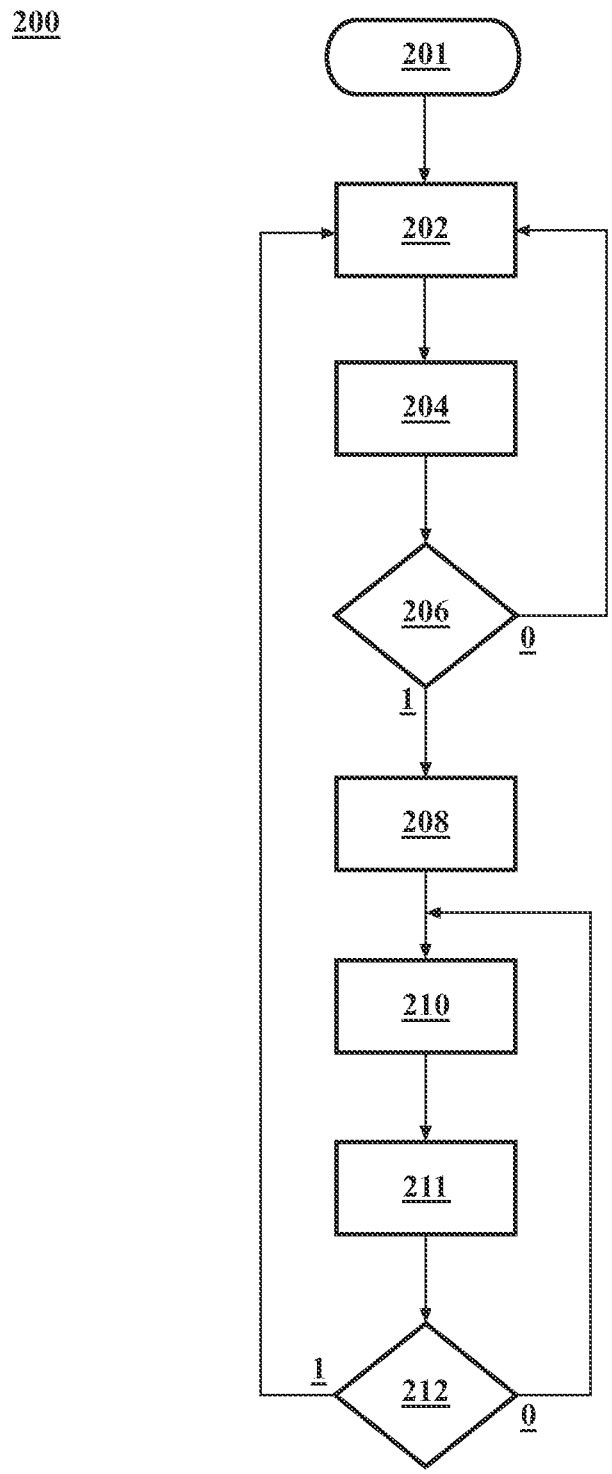
FIG. 2 schematically illustrates a flowchart for controlling an on-vehicle ultra-wide band (UWB) system and access point (AP), in accordance with the disclosure.

FIG. 2 illustrates a UWB interference mitigation process (process) 200 employing an embodiment of the vehicle 100 described hereinabove. Overall, the process 200 includes the UWB system 120 sending a request for channel clear to the wireless AP 110 prior to UWB RF transmission from UWB system 120. This request can be sent via the CAN/LIN vehicle network 120, or alternatively other network methods. Inside this request message will include the selected UWB channel that the UWB system 120 will use. The UWB channel selected will then be mapped by the wireless AP 110 to a series of WiFi channels that are identified from a pre-identified list. Once the wireless AP 110 creates the list of WiFi channels, it will transmit a CTS-to-self signal for each of those identified WiFi channels sequentially. For example, if UWB CH5 is selected by the UWB system 120, the wireless AP 110 will map that channel to WiFi channels 57, 61, 65, 69, . . . 153, 157. The wireless AP 110 then transmits a CTS-to-self consecutively for each WiFi channel that was mapped. After the UWB system 120 has sent the channel clearing request, it then knows by pre-determined delays at what time the UWB system 120 can transmit UWB messages via its own system to execute an operation.

An embodiment of the process 200 is described with reference to FIG. 2, with Table 1 being provided as a key wherein the numerically labeled blocks and the corresponding functions are set forth as follows. The process 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 100 shown in FIG. 1.

TABLE 1

| BLOCK | BLOCK CONTENTS |
|---|---|
| 201 | Start |
| 202 | Wireless access point (AP) permits signal transmission in overlapping UWB channels; Vehicle network (CAN/LIN) monitors wireless AP and UWB system. |
| 204 | UWB system sends UWB channel map to wireless AP via vehicle network, indicating to wireless AP which of the UWB channels has been selected |
| 206 | Has UWB localization been triggered? |
| 208 | Wireless AP sends CTS to self for each WiFi channel, following the UWB channel map |
| 210 | Wireless AP communicates via vehicle network (CAN/LIN) to start UWB localization |
| 211 | Enable Operation |
| 212 | Is UWB localization completed? |

Execution of the process 200 may proceed as follows. The steps of the process 200 may be executed in a suitable order, and are not limited to the order described with reference to FIG. 2. As employed herein, the term "1" indicates an answer in the affirmative, or "YES", and the term "0" indicates an answer in the negative, or "NO".

The routine 200 periodically executes, and starts (201) with the wireless AP 110 permitting wireless signal transmission in overlapping UWB channels, while the vehicle communication link (CAN/LIN) 130 monitors the wireless AP 110 and the UWB system 120 (Block 202).

The UWB system 120 sends a UWB channel map to the wireless AP 110 via the communication link 130, thus indicating to wireless AP 110 which of the UWB channels has been selected (Block 204).

Figure 3:
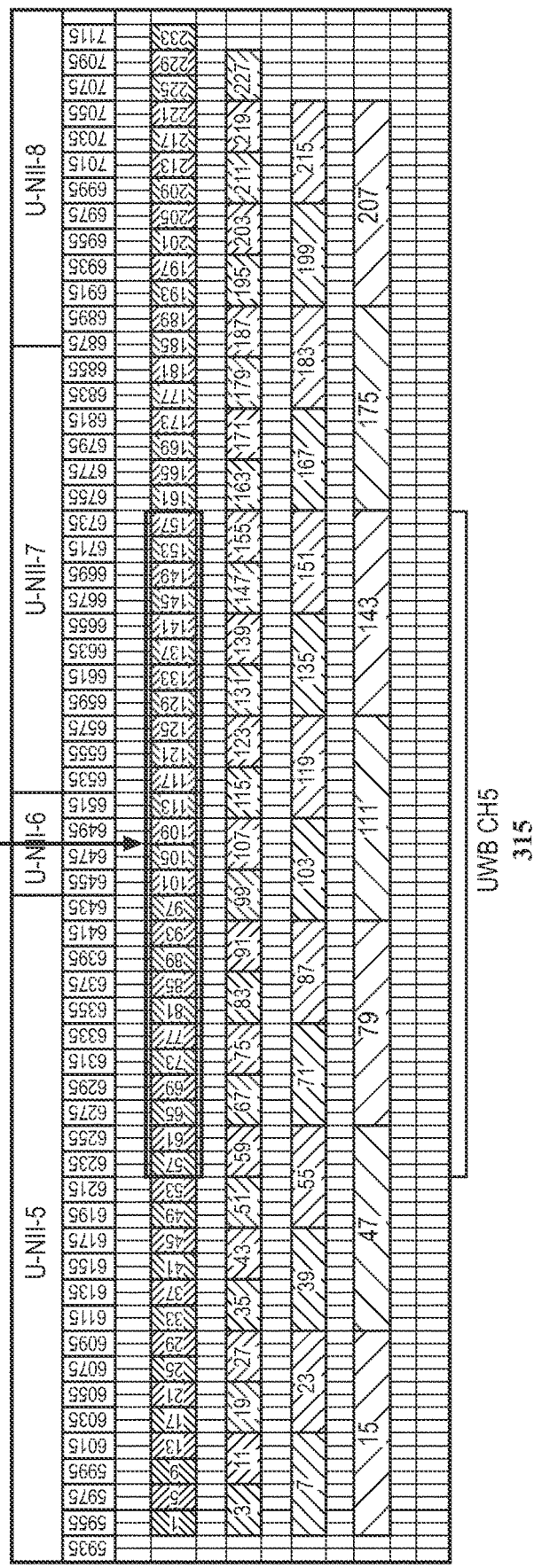
FIG. 3 graphically illustrates a UWB channel map that describes UWB channels in context of the radiofrequency (RF) spectrum, in accordance with the disclosure.

FIG. 3 shows an example of a UWB channel map 300 that describes UWB channels in context of the radiofrequency (RF) spectrum. U-NII (Unlicensed National Information Infrastructure) frequency bands are defined by the US Federal Communication Commission (FCC). The channels U-NII 1 to U-NII 4 are for 5 GHz WLAN (IEEE 802.11a and later), and channels U-NII 5 to U-NII 8 are for 6 GHz WLAN (802.11ax). As shown, specific U-NII frequency bands, including U-NII 5 through U-NII 8, are illustrated, and range between 5935 MHz (5.935 GHz) and 7115 MHz (7.115 GHz). Delineated channels include 20 MHz channels 320, 40 MHz channels 330, 80 MHz channels 340, and 160 MHz channels 350. The 20 MHz channels 320 are WiFi channels, and include a band 325 of WiFi channels 57, 61, 65, . . . 157 (which increment by a quantity of 4) that correspond to UWB channel 5 315. WiFi channels 57, 61, 65, . . . 157 indicates WiFi channels that increment by four between WiFi channel 57 and WiFi channel 157, i.e., every fourth WiFi channel WiFi channel 57 to WiFi channel 157. The UWB channel 5 315 encompasses all or a portion of the U-NII 5 through U-NII 7 frequency bands.

Referring again to FIG. 2, after the UWB system 120 indicates to wireless AP 110 which of the UWB channels has been selected (Block 204), the system determines whether a UWB localization event has been triggered, e.g., due to presence of a remote device such as a key fob or another device seeking access (Block 206).

When a UWB localization event has been triggered (206)(1), the wireless AP 110 sends a Clear to Send (CTS) message to self for each WiFi channel associated with the selected UWB channel, following the UWB channel map (Block 208).

When the selected UWB channel is UWB channel 5, the associated WiFi channels are WiFi channels 57, 61, 65, . . . 157, and the wireless AP 110 sequentially sends a Clear to Send (CTS) message to self for WiFi channels 57, 61, 65, . . . 157 (Block 208).

After the UWB system 120 has sent the channel clearing request, it knows by pre-determined delays at what time the UWB system 120 can transmit UWB messages via its own system. This allows both the wireless AP 110 and the UWB system 120 to operate without interference, allowing coordination between the two vehicle systems.

The CTS message to self serves to stop proximal external WiFi devices 140, 150 from transmitting on those specific WiFi channels for a period of time, causing them to back off and permitting the UWB system 120 to operate without interference.

The wireless AP 110 communicates via the vehicle network (CAN/LIN) 130 to start UWB localization (Block 210). The UWB localization includes sending the transmission time(s) and the reception time(s) to an access control system, thereby enabling the access control system to perform an operation (Block 211). In one embodiment, the operation includes unlocking a door of the access control system.

The UWB localization continues until completed (212)(0).

When the UWB localization is completed (212)(1), the UWB localization ends, and the process restarts (Block 202).

As such, under normal conditions the wireless AP 110 does not transmit a CTS-to-self signal and transmission/reception on all the WiFi channels on which the wireless AP 110 are allowed.

Process 200 allows both the wireless AP 110 and the UWB system 120 to operate without interference, allowing coordination between the two vehicle systems. Process 200 also stops the external WiFi devices 140, 150 from transmitting on those specific WiFi channels causing them to back off and allow the Vehicle UWB System to operate without interference.

The advantages of process 200 is to reduce the risk of interference between WiFi transmissions on devices 150 and the vehicle 100 while operating the UWB system 120 thus increasing the overall robustness and throughput of UWB communication for the UWB system 120. This will reduce system latency and create a better user experience for customers.

The process 200 provides a novel method to send a CTS-to-self multiple times sequentially based on a defined channel map exchanged on the vehicle's communication network (CAN/LIN) 130 using a vehicle's wireless AP 110. By sending the CTS to self across multiple WiFi channels, this will temporarily stop RF transmissions of proximal and surrounding WiFi AP's and clients. By temporarily stopping RF transmissions, this will allow the vehicle's Ultra-wideband (UWB) localization system to operate during the time the transmissions are stopped and reduce interference from the vehicle wireless AP 110 and surrounding WiFi devices that are within range of the vehicle CTS signal. This will reduce system latency with the UWB system 120 and also reduce interference between the vehicle wireless AP 110 and UWB system 120, reducing latency on both systems. This will also inform proximal Wi-Fi APs to clear the channels, thus protecting against other devices outside of the vehicle architecture. This will allow the wireless AP to not have to change to a different channel if it is using a channel at the same frequency band as UWB.

Embodiments in accordance with the present disclosure may be embodied as an apparatus, method, or computer program product. Accordingly, the present disclosure may take the form of a hardware embodiment, a software embodiment (including firmware, resident software, microcode, etc.), or an embodiment combining software and hardware aspects that may generally be referred to herein as a system. Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which has one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for controlling wireless communication on-vehicle, the method comprising:
   detecting, via an on-vehicle wireless access point (AP), a request for localized wireless communication;
   requesting, via an ultra-wide band (UWB) system, the wireless AP to generate a clear to send (CTS) transmission, including:
      selecting an ultra-wide band (UWB) channel, mapping the UWB channel to a plurality of WiFi channels, and sequentially transmitting, by the wireless AP, the clear to send (CTS) transmission to each of the plurality of WiFi channels; and transmitting, via the UWB system, a UWB message in response to the request for localized wireless communication.

2. The method of claim 1, wherein mapping the UWB channel to the plurality of WiFi channels comprises identifying a plurality of sequential WiFi channels corresponding to the UWB channel.

3. The method of claim 2, wherein the UWB channel comprises UWB channel 5, and wherein the plurality of sequential WiFi channels corresponding to the UWB channel comprises WiFi channels 57, 61, 65, . . . 157.

4. The method of claim 1, wherein the UWB system is in communication with the wireless AP via a communication link, and wherein the UWB system requests the wireless AP to generate the CTS transmission via the communication link.

5. The method of claim 1, wherein the UWB message comprises a vehicle command; and wherein transmitting, via the UWB system, the UWB message comprises enabling the vehicle command.

6. The method of claim 5, wherein the vehicle command comprises one of locking an access door, unlocking the access door, opening the access door, or activating a vehicle system.

7. A wireless communication system for a vehicle, comprising:

a wireless access point (AP), an ultra-wide band (UWB) system, a communication link, a controller, and a vehicle system;

wherein the UWB system is in communication with the wireless AP via a communication link;

the wireless communication system operable to:

detect, via the wireless AP, a request for localized wireless communication;

request, via the UWB system, the wireless AP to generate a clear to send (CTS) transmission, including:

select an ultra-wide band (UWB) channel, map the UWB channel to a plurality of WiFi channels, and sequentially transmit, by the wireless AP, the CTS transmission to each of the plurality of WiFi channels; and transmit, via the UWB system, a UWB message in response to the request for localized wireless communication.

8. The wireless communication system of claim 7, wherein mapping the UWB channel to the plurality of WiFi channels comprises identifying a plurality of sequential WiFi channels corresponding to the UWB channel.

9. The wireless communication system of claim 8, wherein the UWB channel comprises UWB channel 5, and wherein the plurality of sequential WiFi channels corresponding to the UWB channel comprises WiFi channels 57, 61, 65, . . . 157.

10. The wireless communication system of claim 7, wherein the UWB system is in communication with the wireless AP via a communication link, and wherein the UWB system requests the wireless AP to generate the CTS transmission via the communication link.

11. The wireless communication system of claim 7, wherein the UWB message comprises a vehicle command to the vehicle system; and wherein transmitting, via the UWB system, the UWB message comprises enabling the vehicle system to execute the vehicle command.

12. The wireless communication system of claim 11, wherein the vehicle command comprises one of locking an access door, unlocking the access door, opening the access door, or activating a vehicle system.

13. A computer product comprising a non-transitory computer readable medium storing a plurality of instructions, that when executed, control an on-vehicle computing device to perform the following steps:

detect, via a wireless AP, a request for localized wireless communication;

request, via an ultra-wide band (UWB) system, the wireless AP to generate a clear to send (CTS) transmission, including:

select a UWB channel, map the UWB channel to a plurality of WiFi channels, and sequentially transmit, by the wireless AP, the CTS transmission to each of the plurality of WiFi channels; and transmit, via the UWB system, a UWB message in response to the request for localized wireless communication.

14. The computer product of claim 13, wherein mapping the UWB channel to the plurality of WiFi channels comprises identifying a plurality of sequential WiFi channels corresponding to the UWB channel.

15. The computer product of claim 13, wherein the UWB system is in communication with the wireless AP via a communication link, and wherein the UWB system requests the wireless AP to generate the CTS transmission via the communication link.

16. The computer product of claim 13, wherein the UWB message comprises a vehicle command; and wherein transmitting, via the UWB system, the UWB message comprises enabling the vehicle command.

17. The computer product of claim 16, wherein the vehicle command comprises one of locking an access door, unlocking an access door, opening an access door, or activating a vehicle system.

\* \* \* \* \*